United States Patent [19]

Piekarski et al.

[11] 3,991,259
[45] Nov. 9, 1976

[54] CATALYST AND PROCESS FOR THE PREPARATION OF LOW-PRESSURE POLYETHYLENE

[75] Inventors: Gottfried Piekarski; Dieter Kippe; Anton Hundmeyer; Dieter Kurz, all of Burghausen; Siegmund Maier, Emmerting, all of Germany

[73] Assignee: Wacker-Chemie GmbH, Munich, Germany

[22] Filed: Mar. 24, 1975

[21] Appl. No.: 561,045

[30] Foreign Application Priority Data
Mar. 27, 1974 Germany............................ 2414784

[52] U.S. Cl.............................. 526/97; 252/429 A; 252/429 B; 252/430; 252/431 R; 260/448 A; 526/119; 526/124; 526/125; 526/127; 526/128; 526/129; 526/352; 526/904
[51] Int. Cl.$^2$...................... C08F 4/66; C08F 10/02
[58] Field of Search ................. 260/88.2 R, 94.9 B, 260/94.9 DA, 94.9 E, 94.9 C; 252/429 A, 429 B, 431 R, 430; 526/127, 128, 97, 124, 125, 129

[56] References Cited
UNITED STATES PATENTS

| | | | |
|---|---|---|---|
| 3,202,617 | 8/1965 | Enk et al...................... | 260/94.9 C |
| 3,644,318 | 2/1972 | Diedrich et al. ............... | 260/94.9 E |
| 3,755,274 | 8/1973 | Piekarski et al. .............. | 260/94.9 C |

FOREIGN PATENTS OR APPLICATIONS
1,958,488  5/1970  Germany

OTHER PUBLICATIONS
Borisov et al., Organosilicon Heteropolymers and Heterocompound, Plenium Pren., N.Y. (1970) pp. 274–286

*Primary Examiner*—Edward J. Smith
*Attorney, Agent, or Firm*—Hammond & Littell

[57] ABSTRACT

A catalyst for the preparation of low-pressure polyethylene comprising the reaction product, at a temperature of from 0° to 100° C, of
(A) a reaction product of a dialkyl aluminum hydride with a polysiloxane having a viscosity of from 5 to 100 cSt (25° C) and siloxane units having the formula

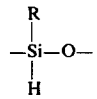

in a molar ratio of from 0.8 to 2 mols of said siloxane units per mol of said dialkyl aluminum hydride, with
B. a compound of the formulae

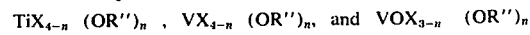

where X is halogen, R'' is an aliphatic hydrocarbon, and *n* is an integer from 0 to 2; as well as a method of producing low-pressure polyethylene utilizing said catalyst.

29 Claims, No Drawings

CATALYST AND PROCESS FOR THE PREPARATION OF LOW-PRESSURE POLYETHYLENE

THE PRIOR ART

Catalysts frequently used in the manufacture of low-pressure polyethylene are made from two components. The first component is a titanium compound, for example, titanium tetrachloride. The second component may be (a) an organoaluminum compound, for example, triethyl-aluminum, or diethylaluminum chloride, (Ziegler catalysts; see Belgian Pat. Nos. 533,362 and 534,792), may be (b) the reaction product of a polymeric organosilicon compound containing siliconhydrogen bonds, for example, a methylhydrogenpolysiloxane, with an inorganic aluminum compound, for example, aluminum chloride, (Wacker catalysts; see German Pat. Nos. 1,191,105 and 1,545,184), or lastly may be (c) the reaction product of a trialkyl-aluminum, for example, triethyl-aluminum, with a methylhydrogenpolysiloxane in a molar ratio of 1:1 to 2 (see U.S. Pat. No. 3,755,274.

Other catalysts that have been described for such use are formed simultaneously from three components, for example, a titanium compound, an organoaluminum compound, and a methyl-hydrogenpolysiloxane, at the beginning of the polymerization.

The disadvantages of the above processes for the manufacture of low-pressure polyethylene have already been described in detail in various literature references, and so will be discussed only very briefly here. One major disadvantage of all catalysts in the manufacture of which polymeric organosilicon compounds, for example, methylhydrogenpolysiloxanes are employed, is that the specific catalyst consumption, as measured in grams of catalyst per kilogram of polyethylene is comparatively high. A further disadvantage of the use of such catalysts is that expensive procedures are necessary for working up the polymer to the requisite purity. Further disadvantages of the above processes are discussed in U.S. Pat. No. 3,065,220, columns 4 and 5; German Pat. No. 1,545,184, Comparison Example 4; U.S. Pat. 3,755,274, description and Comparison Examples 5a, b, c and g; and in our copending commonly-assigned U.S. Pat. Application No. 561,026, filed concurrently herewith, at the end of the description.

OBJECTS OF THE INVENTION

An object of the present invention is the development of an improved catalyst and method for the production of low-pressure polyethylene.

Another object of the present invention is the development of a catalyst for the production of low-pressure polyethylene consisting essentially of the reaction product prepared at a temperature of from 0° to 100° C of A. a reaction product prepared at a temperature of from 0° to 80° C of a dialkyl aluminum hydride having from 2 to 8 carbon atoms in each of the alkyls, with a hydrogenpolysiloxane having a viscosity of from 5 to 100cSt at 25° C and siloxane units having the formula

wherein R is a member selected from the group consisting of alkyl having from 1 to 6 carbon atoms, cycloalkyl having from 5 to 6 carbon atoms and phenyl, said hydrogenpolysiloxane having the three valences of its silicon atoms on the ends of polysiloxane chain satisfied by R, hydrogen or, at most, one hydroxyl group per end silicon atom, in a molar ratio of from 0.8 to 2 mols of said siloxane per mol of said dialkyl aluminum hydride, with B. a metallic compound having a formula selected from the group consisting of

wherein X is halogen, R'' is a number selected from the group consisting of alkyl having 1 to 8 carbon atoms and cycloalkyl having from 5 to 6 carbon atoms, and $n$ is an integer from 0 to 2, and mixtures thereof, said Component B being employed in an amount of from 0.1 to 3 mols for each mol of said siloxane units in Component A.

A yet further object of the present invention is the development, in a process for the production of low-pressure polyethylene which comprises polymerizing monomers selected from the group consisting of ethylene and mixtures of ethylene with up to 10 mol percent of α-olefins having 3 to 8 carbon atoms at a temperature of from 50° C to 130° C and a pressure of from 1 to 100 atmospheres in the presence of a polymerization catalyst prepared from (a) polymeric organosilicon compounds containing hydrogen bonded to silicon, (b) organo-aluminum compounds and (c) compounds of the heavy metals of the IV to VI sub-groups of the Periodic System, the improvement which consists of utilizing as said polymerization catalyst, the reaction product prepared at a temperature of from 0° to 100° C of A. a reaction product prepared at a temperature of from 0° to 80° C of a dialkyl aluminum hydride having from 2 to 8 carbon atoms in each of the alkyls, with a hydrogenpolysiloxane having a viscosity of from 5 to 100cSt at 25° C and siloxane units having the formula

wherein R is a member selected from the group consisting of alkyl having from 1 to 6 carbon atoms, cycloalkyl having from 5 to 6 carbon atoms and phenyl, said hydrogen-polysiloxane having the three valences of its silicon atoms on the ends of polysiloxane chain satisfied by R, hydrogen or, at most, one hydroxyl group per end silicon atom, in a molar ratio of from 0.8 to 2 mols of said siloxane per mol of said dialkyl aluminum hydride, with B. a metallic compound having a formula selected from the group consisting of

wherein X is halogen, R' is a number selected from the group consisting of alkyl having 1 to 8 carbon atoms and cycloalkyl having from 5 to 6 carbon atoms, and n is an integer from 0 to 2, and mixtures thereof, said Component B being employed in an amount of from 0.1 to 3 mols for each mol of said siloxane units in Component A.

These and other objects of the invention will become more apparent as the description thereof proceeds.

DESCRIPTION OF THE INVENTION

The present invention now provides a process for the manufacture of low-pressure polyethylene in which ethylene is polymerized, optionally with up to 10 mol percent (based on the total amount of monomers) of an α-olefin having from 3 to 8 carbon atoms, at a temperature of from 50° C to 130° C, at a pressure of from 1 to 100 atmospheres, and in the presence of certain improved catalysts prepared from polymeric organosilicon compounds containing hydrogen bonded to silicon, organoaluminum compounds, and compounds of heavy metals of sub-groups IV or V. It has been found that by the use of these particular catalysts, the disadvantages of the prior art can substantially be overcome.

The catalyst used according to the present invention is the product formed by reacting, at a temperature of from 0° C to 100° C, preferably from 20° C to 90° C, A. a reaction product of a dialkyl aluminum hydride, the alkyl groups of which each have 2 to 8 carbon atoms, with a hydrogenpolysiloxane having a viscosity of from 5 to 100 cSt at 25° C, and containing siloxane units of the general formula

in which R denotes an alkyl group having up to 6 carbon atoms, an aryl group, or a cycloalkyl group having the three valences of the silicon atoms, at the ends of the siloxane chain satisfied with R, hydrogen, or, at most, one hydroxy group in a molar ratio of from 0.8 to 2 mols of siloxane units per mol of dialkyl-aluminum hydride, with B. a compound of the general formulae

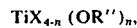

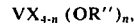
and

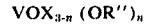

in which X denotes a halogen atom, R'' denotes an aliphatic group having from 1 to 8 carbon atoms, and n denotes a number from 0 to 2.

The catalyst of the invention is, therefore, the reaction product prepared at a temperature of from 0° to 100° C of A. a reaction product prepared at a temperature of from 0° to 80° C of a dialkyl aluminum hydride having from 2 to 8 carbon atoms in each of the alkyls, with a hydrogenpolysiloxane having a viscosity of from 5 to 100 cST at 25° C and siloxane units having the formula

wherein R is a member selected from the group consisting of alkyl having from 1 to 6 carbon atoms, cycloalkyl having from 5 to 6 carbon atoms and phenyl, said hydrogenpolysiloxane having the three valences of its silicon atoms on the ends of polysiloxane chain satisfied by R, hydrogen or, at most, one hydroxyl group per end silicon atom, in a molar ratio of from 0.8 to 2 mols of said siloxane per mol of said dialkyl aluminum hydride, with B. a metallic compound having a formula selected from the group consisting of

wherein X is halogen, R'' is a number selected from the group consisting of alkyl having 1 to 8 carbon atoms and cycloalkyl having from 5 to 6 carbon atoms, and n is an integer from 0 to 2, and mixtures thereof, said Component B being employed in an amount of from 0.1 to 3 mols for each mol of said siloxane units in Component A. The invention also resides, in a process for the production of low-pressure polyethylene which comprises polymerizing monomers selected from the group consisting of ethylene and mixtures of ethylene with up to 10 mol percent of α-olefins having 3 to 8 carbon atoms at a temperature of from 50° C to 130° C and a pressure of from 1 to 100 atmospheres in the presence of a polymerization catalyst prepared from (a) polymeric organo-silicon compounds containing hydrogen bonded to silicon, (b) organo-aluminum compounds and (c) compounds of the heavy metals of the IV to VI sub-groups of the Periodic System, the improvement which consists of utilizing, as said polymerization catalyst, the reaction product prepared at a temperature of from 0° to 100° C of A. a reaction product prepared at a temperature of from 0° to 80° C of a dialkyl aluminum hydride having from 2 to 8 carbon atoms in each of the alkyl, with a hydrogenpolysiloxane having a viscosity of from 5 to 100 cST at 25° C and siloxane units having the formula

wherein R is a member selected from the group consisting of alkyl having from 1 to 6 carbon atoms, cycloalkyl having from 5 to 6 carbon atoms and phenyl, said hydrogen polysiloxane having the three valences of its silicon atoms on the ends of polysiloxane chain satisfied by R, hydrogen or, at most, one hydroxyl group per end silicon atom, in a molar ratio of from 0.8 to 2 mols of said siloxane per mol of said dialkyl aluminum hydride, with B. a metallic compound having a formula selected from the group consisting of

wherein X is halogen, R'' is a number selected from the group consisting of alkyl having 1 to 8 carbon atoms and cycloalkyl having from 5 to 6 carbon atoms, and n is an integer from 0 to 2, and mixtures thereof, said Component B being employed in an amount of from 0.1 to 3 mols for each mol of said siloxane units in Component A.

The present process can be used for the manufacture of simple polyethylenes and also for the manufacture of modified polyethylenes incorporating up to 10 mol percent (based on the total amount of monomers) of an α-olefin having from 3 to 8 carbon atoms. Examples of such α-olefins are propylene, but-1-ene, 3-methylbut-1ene, pent-1-ene, 4-methylpent-1-ene, hex-1-ene, hept-1-ene, and oct-1-ene. The incorporation of these higher olefins in the polyethylene results in the formation of a lower density product. Any references hereinafter to polyethylene or to the polymerization of ethylene are to be read as including such modified polyethylenes unless the context obviously requires otherwise.

Component (A) for the preparation of the catalysts used according to the invention is the reaction product of a dialkyl aluminum hydride and a hydrogenpolysiloxane. These reaction products are slightly viscous liquids, which are free of dialkyl aluminum hydrides, and do not ignite spontaneously in air. The major products are thought to be of the general formula

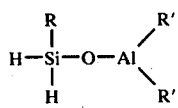

in which R has the meaning given above, and each R' denotes an alkyl group having from 2 to 8, preferably from 2 to 4 carbon atoms. It can thus be seen that the products predominantly contain two hydrogen atoms per silicon atom, in addition to the Si - O - Al groups. In addition to compounds of the above formula, the reaction product includes various undefined by-products but these do not need to be removed before the further use of the reaction product. The products can be obtained practically quantitatively from the starting materials, generally at temperatures between 0° C and 80° C, preferably between 20° C and 80° C. The use of elevated pressure is not necessary. The reaction generally takes from 1 to 3 hours. The process for the manufacture of these products is described in more detail, and is claimed, in our copending U.S. Pat. Application No. 561,026, filed concurrently herewith.

The dialkyl aluminum hydrides used have alkyl moieties each having from 2 to 8, preferably from 2 to 4, carbon atoms. The two alkyl moieties may be identical or different. Examples of suitable alkyl groups are ethyl, n-propyl, isopropyl, n-butyl, isobutyl, 2-ethylhexyl, and n-octyl groups. The preferred dialkyl aluminum hydrides are diethyl aluminum hydride, di-n-butyl aluminum hydride, and diisobutyl aluminum hydride, the latter compound being industrially easily obtainable.

Suitable organohydrogenpolysiloxanes are, for example, methylhydrogenpolysiloxanes which are end-blocked with trimethylsilyl groups and have a viscosity of from 20 to 40 cSt at 25° C, ethylhydrogenpolysiloxanes which are end-blocked as above, and have a viscosity of from 25 to 40 cSt at 25° C, and phenylhydrogenpolysiloxanes also with the same end-blocking and having a viscosity of from 45 to 70 cSt at 25° C.

Cyclic hydrogenpolysiloxanes are also suitable, for example, methylhydrogencyclotrisiloxane, and methylhydrogencyclotetrasiloxane. Methylhydrogenpolysiloxanes are commercially available. These generally have a viscosity of from 25 to 35 cSt at 25° C, and are mostly end-blocked with trimethylsilyl groups having a hydroxy group content of from 0.05% to 0.2%, preferably 0.1%, by weight.

A preferred example of Component A is the reaction product of a methylhydrogenpolysiloxane having a viscosity of from 20 to 40 cSt at 25° C with a dialkyl aluminum hydride, the alkyl moieties of which each have from 2 to 4 carbon atoms, in a molar ratio of from 1 to 1.2 mols of siloxane units per mol of dialkyl aluminum hydride.

Component B used in the manufacture of the catalyst used according to the invention is a titanium or vanadium tetrahalide, trihalide monoalkanolate, or dihalide dialkanolate, or a vanadium oxytrihalide, oxydihalide monoalkanolate, or oxymonohalide dialkanolate. Examples of such compounds are titanium tetrachloride, titanium tetrabromide, titanium trichloride n-propylate, titanium trichloride isopropylate, titanium trichloride n-butylate, titanium trichloride isobutylate, and corresponding titanium dichloride dialkanolates, and vanadium tetrachloride, vanadium trichloride n-propylate, vanadium oxytrichloride, and vanadium oxydichloride n-propylate. Mixtures of two or more of the compounds are often used.

The monoalkanolates and dialkanolates where the alkanol has from 2 to 8 carbon atoms can be prepared by equilibrating the appropriate titanium or vanadium tetrahalides and tetraalkanolates, or the vanadium oxytrihalides and oxytrialkanolates. The starting materials are used in such proportions as to give the desired ratio of monoalkanolates to dialkanolates. The resulting monoalkanolates and dialkanolates are not generally isolated either from ach other or from the starting materials.

The preferred compounds for Component B are titanium trichloride n-propylate and a mixture thereof with titanium tetrachloride.

The reaction of Component A with Component B to give the catalysts used according to the invention is carried out with the exclusion of air and moisture at from 0° C to 100° C, preferably at from 20° C to 90° C. The reaction is preferably carried out in an inert liquid organic solvent, not more than a 20-fold excess by volume of the solvent generally being used. Suitable solvents are, for example, the alkanes having from 5 to 9 carbon atoms such as n-hexane, n-heptane, isooctane, or the cycloalkanes having from 5 to 9 carbon atoms such as cyclohexane, and methylcyclohexane. (Component A dissolves in the solvent, whereas Component B remains in suspension.) The reactions are generally used in a molar ratio of from 0.1 to 3 mols of Component B per mol of siloxane units in Component A.

In certain cases it can be desirable to carry out the catalyst formation in two stages: Component A is first reacted with the alkanolate-free titanium or vanadium compound, namely the titanium or vanadium tetrahalide or the vanadium oxytrihalide, preferably titanium tetrachloride, and then the requisite amount of the alkanolate, preferably titanium trichloride n-propylate, is added. Alternatively, the reverse sequence may be used; that is to say the alkanolate is first reacted with Component A and then the alkanolate-free compound is added. The reaction conditions, such as dilution, stirring, temperature, and reaction duration, may be the same or different for the two stages. This two-stage procedure is particularly advisable when the net ratio of alkanolate groups to metal atoms in Component B is less than 1; that is to say, for example, in the case of a Component B mixture having the net formula $TiCl_{3.6}(OR)_{0.4}$.

The catalysts obtained according to the above process are generally dark brown to black-brown suspensions, depending on the particular reactants and reaction conditions: the solid catalyst components are suspended either in the organic solvent diluent, if used, or in the liquid catalyst components. When suitably diluted with liquid inert organic diluents, the catalysts can be kept for long periods of time, provided that air and moisture are excluded.

In many cases the activity of the catalysts can be increased by manufacturing the catalyst on a dry deaerated solid support, which is preferably finely-divided. The activating effect of such supports on catalysts for the low-pressure polymerization of ethylene has previously been described: Canadian Pat. No. 818,655 in the case of Ziegler catalysts, the German Patents Nos. 1,545,177 and 1,545,184 for Wacker catalysts. In both these previously described cases, however, it is necessary to use either large amounts of catalyst or large amounts of support, with the result that the support and/or catalyst have to be removed from the polymerization product. In contrast, however, the catalysts used according to the present invention surprisingly become very active upon addition of the supports so that very little catalyst and support suffices. The above-mentioned disadvantages are thus avoided since the small amount of catalyst and support can be left in the polyethylene for most purposes. If, however, it is desired to dissolve or decompose the catalyst in order to obtain especially pure polyethylene for certain purposes, only small amounts of aliphatic alcohols are required.

Examples of suitable finely-divided supports are sodium chloride, sodium sulfate, magnesium oxide, magnesium hydroxide, magnesium ethylate, ethoxy-magnesium chloride, magnesium chloride, magnesium trisilicate ($2MgO.3 SiO_2$), calcium oxide, calcium chloride, silicon dioxide, aluminum oxide, titanium dioxide, zirconium dioxide, and polyethylene, as well as mixtures thereof. The support should be free from water of crystallization.

The amount of support used is generally from 1% to 30%, preferably from 10% to 20%, by weight, relative to the weight of Components A and B. This is substantially less than the amounts of from 1 to 4 parts by weight per part of weight of silicon-hydrogen compound that have been described for use with the Wacker catalysts (German Patent No. 1,545,184).

The procedure for the preparation of the catalyst on the support depends partly on the nature of the support. The generally preferred procedure is to bring Component B into contact with the support at a temperature of from 20° C to 140° C, and subsequently to add Component A, although it is possible first to bring Component A into contact with the support at from 20° C to 140° C and subsequently to add Component B. The temperature of the system must, of course, be between 0° C and 100° C before the second component (be it Component A or Component B) is added. If Component B is first added to the support, any equilibration reaction necessary for the preparation of Component B can be carried out either before addition to the support or in situ on the support.

The catalysts and catalyst/support systems prepared in the above manner are preferably washed with an inert organic solvent in order to remove any soluble titanium or vanadium compounds, in which case the catalyst system is subsequently reactivated. This can be achieved in the polymerization chamber by adding a trialkyl aluminum or a dialkyl aluminum hydride, for example, triethyl aluminum, triisobutyl aluminum, or diisobutyl aluminum hydride. From 5 to 20 mols, preferably from 8 to 15 mols, of the activating aluminum alkyl compound are generally used per gram atom of titanium or vanadium used in Component B. An activating effect can alternatively be achieved by introducing small amounts of a support into the polymerization chamber. In this way, catalyst systems that have been weakened by impurities, or that are inactive can be ractivated; thus, the working life of the catalysts can be increased.

The catalyst consumption is very low in the present process, even when using a small continuous polymerization installation (e.g. a 100 liter autoclave), although the actual consumption naturally depends on the desired type of polyethylene. This low consumption is of advantage both for economic reasons and with regard to the polymer purity. Moreover, it is possible to manufacture both low-molecular-weight injection-molding grades of polyethylene with a narrow molecular-weight distribution and high-molecular-weight blow-molding grades with a broad molecular-weight distribution using catalyst consumptions of from 0.04 to 0.3 m.-mols of the sum of Components A and B per mol of ethylene, which corresponds to from 0.3 to 2.3 gm of catalyst per kg of polyethylene (including any support and activating aluminum-alkyl compound). The type of polyethylene produced depends on the catalyst consumption used. This is an important advance since it has not previously been possible to manufacture all the various types of polyethylene with one catalyst merely by slight variation in the preparation of the catalyst and/or in the amounts of catalyst used. Furthermore, conversions of about 96% are obtained with a high space-time yield and with simple working-up.

The polymerization of ethylene according to the invention is carried out at a pressure of from 1 to 100 atmospheres, preferably at from 5 to 20 atmospheres, and at a temperature of from 50° C to 130° C. It can be carried out in solution, in suspension, or in the gas phase. Suitable solution and suspension media are those inert organic liquid diluents that can be used in the preparation of the catalysts. The most generally used polymerization process is the suspension process, using polymerization temperatures of from 60° C to 90° C. When polymerization is carried out in the gas phase in a suitable flow-bed reactor, only very small amounts of diluent are necessary, namely that amount needed for metering-in the catalyst.

In liquid-phase polymerization, aliphatic alcohols, especially isopropanol, can if necessary be used in amounts of from 1% to 10% by volume, relative to the total volume of liquid diluent, for dissolving or decomposing the catalyst.

As mentioned previously, the molecular weight and the molecular-weight distribution of the polyethylene can be regulated by the nature and/or amount of catalyst used. They can also be regulated by the polymerization temperature and by additives, for example, hydrogen and titanium tetrachloride, introduced before or during the polymerization. Regulation of the molecular weight by means of hydrogen (up to 5% by volume of hydrogen relative to the total amount of monomers) has previously been described. Titanium tetrachloride can be added only when no activating aluminum alkyl compounds were used. In order to achieve a well-defined effect, the amount of titanium tetrachloride added advantageously should be from 5% to 15% by weight, relative to the weight of Components A and B, and advantageously the titanium tetrachloride should be added to the catalyst before it is introduced into the reactor. This addition of titanium tetrachloride produces both a lowering of the molecular weight and a broadening of the molecular-weight distribution. Other methods of broadening the molecular-weight distribution include, for example, continuously and cyclically varying the hydrogen concentration and/or the polymerization temperature.

EXAMPLES

The following examples illustrate the process of the invention.

The molecular weight distribution of the polyethylene has been given as the non-unformity, U, which is determined by the equation $$(M_w/M_n) - 1 = U$$

The values for the average weight of the molecular weight, $M_w$, and the numerical average of the molecular weight, $M_n$, were determined as follows:

a. the polyethylene was separated into 10 to 15 fractions by means of column fractionation according to Francis et al, J. Polymer Sci., 31, 453–66 (1958); the weights and the reduced specific viscosities of the fractions were determined.

b. The corresponding limiting viscosities and average viscosimetric molecular weights, $M_v$, of the fractions were calculated according to Wesslau, Kuntstoffe 49, 230 (1959) and Tung, High Polymers 20, 514 (1956).

c. $M_n$ and $M_w$ were determined from summation equations according to Cottam, J. Appln. Polymer Sci., Q, 1853-62 (1965), from the weights and $M_v$ values of the individual fractions.

The reduced specific viscosity of the polyethylene $\eta\eta_{red}$, in dl/gm measured at a concentration of 0.1 in decalin at 135° C, is given as a measure of the molecular weight.

The salt index of the polyethylene $i_5$, in gm/10 minutes was measured according to DIN 53,735 under a 5 kp load at 190° C.

The density of the polyethylene, in gm/cm³, was measured on strips of 1 mm thick, pressed plates by the buoyancy method (DIN 53,479) using butyl acetate as the solvent, with determination at 23° C; relative to the density of water at 4° C as 1 gm/cm³.

The powder bulk density of the polyethylene was measured according to DIN 53,468 and is given in gm/l.

The characteristic particle size (average particle size) of the polyethylene was determined according to DIN 53,477 is is quoted in $\mu$.

The ash of the polyethylene was determined by combustion and is given as oxide ash in ppm.

The chlorine (bromine) content in the polyethylene was determined by combustion in a stream of oxygen in a modified Krekeler apparatus, with the combustion gases being collected in water. Colorimetric determination was then carried out according to Iwasaki et al, Bull. Chem. Soc. Japan 25, 226, 1952. The data is given in ppm.

the data U, $\eta_{red}$, $i_5$, density, bulk density, particle size ash and chlorine content would appear adequately to characterize the polyethylenes obtained.

The weights of catalyst given in the examples were calculated on the sum weight of Components A and B, and catalyst support if present.

The quoted volumes of gases were measured at normal temperature and pressure (N.T.P.).

All percentages are calculated by weight, unless stated otherwise.

EXAMPLE 1

Catalyst Preparation 1 mol of diisobutyl aluminum hydride and 1.1 mol (based on siloxane units) of a methylhydrogenpolysiloxane (viscosity 32 cSt at 25° C, density 1.01 gm/cm³) were reacted at 70° C to prepare Component A.

93.2 ml of titanium tetrachloride and 75.2 ml of titanium tetra-n-propylate were equilibrated to prepare Component B, namely titanium trichloride-n-propylate.

16.2 ml (0.707 mol) of Component A (density 0.880 gm/cm³ at 20° C) and 1.134 mols of Component B were reacted in 487 ml of isooctane at 50° C for 5 hours with stirring to prepare the catalyst.

Polymerization 5 m³ of ethylene, 75 liters of hydrogen and 13 liters of isooctane containing 12 gm of catalyst in suspension were fed, per hour, into a 100 liter autoclave containing 88 liters of a suspension (containing catalyst) of 39.5% of polyethylene in isooctane. The suspension was stirred at 85° C under 8.8 atmospheres gauge pressure (ethylene/hydrogen mixture). 196 liters of gas mixture were withdrawn from the gas space of the autoclave per hour, and the ethylene obtained therefrom, after releasing the pressure, was recycled. Polymer suspension was discharged from the autoclave so as to maintain a constant volume of suspension in the autoclave.

The discharged polymer suspension was, after pressure release, stirred with 3.75 liters/h of a mixture of isooctane and 20% by volume of isopropanol (obtained from continuous working up of the solvent), and the polymer was separated on a scraper centrifuge. The separated polymer was rinsed with 6 liters/h of the mentioned solvent mixture. The polymer was dried to give 5.9 kg/h of a pure white coarse-grained polyethylene having the following properties:

| | |
|---|---|
| melt index $i_5$ | 23.8 gm/10 min. |
| $\eta$ red | 1.34 dl/gm |
| non-homogeneity U | 2.3 |
| density | 0.963 gm/cm³ |
| bulk density | 400 gm/l |
| particle size | 480 $\mu$ |
| ash | 65 ppm |
| chlorine content | 35 ppm |

The catalyst consumption was 2 gm/kg of polymer. The solvent consumption was:

| | | |
|---|---|---|
| for polymerization | 2.2 | liters isooctane |

-continued

| | |
|---|---|
| for catalyst decomposition | 0.64 liters isooctane/isopropanol |
| for washing | 1.02 liters isoctane/isopropanol |
| total | 3.86 liters/kg of polymer. |

No deposits were found in the reactor even after prolonged operation. The polyethylene was suitable for direct conversion to distortion-free injection-molded articles.

Comparison

An analogous continuous ethylene polymerization was carried out using a different catalyst for comparison purposes.

The catalyst was prepared from (A) a reaction product of 1 mol of triethyl aluminum and 1 mol, based on siloxane units, of a methyldrogenpolyisiloxane according to U.S. Pat. No. 3,755,274 and (B) titanium trichloride-n-propylate, in the same molar ratio and under the same conditions as above.

3.6 m³/h of ethylene, 82 l/h of hydrogen, and 9 l/h of isooctane containing 12 gm of suspended catalyst were fed into the autoclave. The polyethylene was worked up as before, but it was found that greater amounts of solvent were needed for decomposing the catalyst and for washing the polymer, in order to obtain a product of corresponding purity. The amount of solvent used was 6.09 l/kg (2.15 + 1.79 + 2.15 l/kg) of polymer. 4.2 kg/h of polyethylene were obtained. It had the following properties:

| | |
|---|---|
| melt index $i_5$ | 24.8 gm/10 min. |
| $\eta$ red | 1.33 dl/gm |
| non-homogeneity U | 2.2 |
| density | 0.962 gm/cm³ |
| bulk density | 427 gm/l |
| particle size | 320 $\mu$ |
| ash | 85 ppm |
| chlorine content | 40 ppm |

EXAMPLE 2

Catalyst preparation

Component A was prepared from 1 mol of di-n-butyl aluminum hydride and 1 mol, based on siloxane units, of a methylhydrogenpolysiloxane (viscosity 32 cSt at 25° C) at 68° C to 70° C.

Component B was prepared by equilibrating 94 ml of titanium tetrachloride and 75.8 ml of titanium tetra-n-propylate at 50° C to give titanium trichloride-n-propylate.

165.6 ml of Component A (density 0.862 gm/cm³ at 20° C) and 244 ml of Component B (molar ratio 1: 1.61) were reacted in 1.16 liters of isooctane at 60° C for 4 hours to give a dark brown catalyst suspension.

Polymerization

Polymerization was carried out as in Example 1 except that only 44.2 l/h of hydrogen were fed in. 6.1 kg/h of polyethylene were obtained, and this had the following properties:

| | |
|---|---|
| melt index $i_5$ | 23.5 gm/10 min. |
| $\eta$ red | 1.38 dl/gm |
| non-homogeneity U | 2.24 |
| density | 0.962 gm/cm³ |
| bulk density | 367 gm/l |
| particle size | 360 $\mu$ |

The catalyst consumption was quite low, namely 1.97 gm/kg of polymer.

EXAMPLE 3

Catalyst preparation

Component A was the reaction product of 1 mol of diethyl aluminum hydride and 1.2 mols, based on the siloxane units, of a methylhydrogenpolysiloxane (viscosity 29 cSt at 25° C, density 0.896 gm/cm³).

127.9 ml of Component A and 270 ml of titanium trichloride-n-propylate, Component B, were reacted in 540 ml of isooctane at 30° C to 50° C for 3 hours.

Polymerization

Polymerization was carried out analogously to Example 1, but using 88.2 l/h of hydrogen. The catalyst consumption was 1.99 gm/kg of polymer. 6.04 kg/h of polyethylene were obtained, which had the following properties:

| | |
|---|---|
| melt index $i_5$ | 15.4 gm/10 min. |
| $\eta$ red | 1.45 dl/gm |
| non-homogeneity U | 1.82 |
| density | 0.960 gm/cm³ |
| bulk density | 385 gm/l |
| particle size | 340 $\mu$ |

The polyethylene could be injection-molded to give particularly impact-resistant moldings.

EXAMPLE 4

Catalyst preparation 64.74 ml (0.59 mol) of titanium tetrachloride were stirred for 20 minutes at 58° C with 113.6 ml (0.494 mol) of Component A prepared in 570 ml of isooctane with the exclusion of air and moisture, in accordance with Example 1. To the mixture were added 44.06 gm of titanium trichloride-n-propylate, which had been obtained by equilibrating 17.04 ml (0.153 mol) of titanium tetrachloride and 13.62 ml (0.051 mol) of titanium tetra-n-propylate in 20 ml of isooctane at 60° C. The mixture was maintained at 58° C for 1.5 hours to give a black-brown catalyst suspension.

Polymerization 3.9 m³/h of ethylene, 33.2 l/h of hydrogen, and 4 gm/h of catalyst in 11 l/h of isooctane were fed into an autoclave, and 196 l/h of gas mixture were withdrawn from the autoclave. The solids content of the suspension within the reactor was 37%, and the reactor contents were maintained at 80° C under a pressure of 8.8 atmospheres gauge. 4.46 kg/h of polyethylene were obtained after working up. The catalyst consumption was 0.9 mg/kg of polyethylene. The solvent consumption was:

| | |
|---|---|
| for polymerization | 2.45 liters isooctane |
| for catalyst decomposition | 0.17 liters isooctane/isopropanol |
| for washing | 0.28 liters isooctane/isopropanol |
| total | 2.90 l/kg of polyethylene. |

The polyethylene was suitable for the manufacture of large containers by blow-molding. Direct processing of the polymer powder was also possible. Swelling at the nozzle was readily controllable because of the well-balanced molecular weight distribution of the polymer. The properties of the polymer were as follows:

| | |
|---|---|
| melt index $i_5$ | 0.33 gm/10 min. |
| η red | 3.65 dl/gm |
| non-homogeneity U | 14.3 |
| density | 0.953 gm/cm³ |
| bulk density | 380 gm/l |
| particle size | 335 μ |
| ash | 45 ppm |
| chlorine content | 21 ppm |

EXAMPLE 5

Catalyst preparation 113.2 ml of Component A, prepared as in Example 1, were reacted in 226 ml of isooctane at 50° C for 90 minutes with titanium trichloride-n-propylate, which had been prepared from 19.62 ml titanium tetrachloride and 15.66 ml of titanium tetra-n-propylate. In a second stage, 61 ml of titanium tetrachloride were added to the mixture, which was maintained at 50° C for a further 90 minutes.

Polymerization

Polymerization was carried out as in Example 4 except that only 9 l/h of hydrogen was fed into the autoclave in order to obtain the desired molecular weight of the polymer. The amount of isooctane fed in was 12.5 l/h. 53 kg of polymer had been obtained after 8 hours, with a catalyst consumption of only 0.6 gm/kg of polyethylene. The polyethylene had the following properties:

| | |
|---|---|
| melt index $i_5$ | 0.35 gm/10 min. |
| η red | 3.56 dl/gm |
| non-homogeneity U | 12.6 |
| density | 0.954 gm/cm³ |
| bulk density | 454 gm/l |
| particle size | 310 μ |

EXAMPLE 6

Catalyst preparation 56.8 ml of Component A, prepared as in Example 1, were reacted with 22 gm of titanium trichloride-n-propylate in 114 ml of isooctane at 50° C for 1 hour. The mixture was then diluted with a further 25 ml of isooctane and 32.4 ml of titanium tetrachloride were added. The mixture was maintained at 50° C for a further 2 hours.

Polymerization 38 l/h of hydrogen, 11 l/h of isooctane, and 6 gm/h of catalyst were fed into the autoclave in addition to the ethylene. 40.5 kg of polyethylene were obtained after 8 hours polymerization at 80° C and 8.8 atmospheres gauge. The catalyst consumption was 1.2 gm/kg of polymer. The properties of the polymer were as follows:

| | |
|---|---|
| melt index $i_5$ | 1.6 gm/10 min. |
| η red | 2.5 dl/gm |
| non-homogeneity U | 10.6 |
| density | 0.956 gm/cm³ |
| bulk density | 430 gm/l |
| particle size | 325 μ |

EXAMPLE 7

Catalyst preparation

The catalyst was prepared in 650 ml of isooctane and in the presence of 58.1 gm of ethoxy-magnesium chloride, by reacting the components specified in Example 1 in the amounts there-specified for 45 minutes at 60° C. Soluble titanium compounds were then removed by repeated elution with isooctane.

Polymerization

Polymerization was carried out at 85° C and 8.8 atmospheres gauge using 3.74 m³/h of ethylene, 88 l/h of hydrogen, 1.67 gm/h of catalyst, 10 l/h of isooctane, and 5 ml/h of triethyl aluminum. Gas was withdrawn from the reactor at a rate of 196 l/h, and the solids concentration within the reactor was maintained at 38.7%. Little working up was required, and a very pure polyethylene was obtained in a yield of 4.36 kg/h. The catalyst consumption was 380 mg (sum of Components A, B and support) /kg of polymer. The amounts of solvent used were:

| | |
|---|---|
| for polymerization | 2.3 liters of isooctane |
| for catalyst decomposition | 0.17 liters of isooctane/isopropanol |
| for washing | 0.17 liters of isooctane/isopropanol |
| total | 2.64 l/kg of polyethylene |

The properties of the polyethylene were as follows:

| | |
|---|---|
| melt index $i_5$ | 19.3 gm/10 min. |
| η red | 1.37 dl/gm |
| non-homogeneity U | 3.7 |
| density | 0.961 gm/cm³ |
| bulk density | 355 gm/l |
| particle size | 360 μ |
| ash | 22 ppm |
| chlorine content | 9 ppm |

EXAMPLE 8

This example illustrates the influence of the addition of titanium tetrachloride during polymerization on the molecular weight and molecular-weight distribution of the polymer.

Catalyst preparation

The components and amounts thereof were as specified in Example 5. The first stage of the preparation was carried out at 60° C and after 45 minutes 68 ml of isooctane were added. The second stage was also carried out at 60° C. and after 40 minutes, 68 ml of isooctane were added.

Polymerization

Catalyst was metered into the reactor at the rate of 4 gm/h and hydrogen at the rate of 23.8 l/h. 2.2 ml of titanium tetrachloride were metered in per 32 gm of catalyst, all in addition to ethylene. 28.7 kg of polyethylene had been obtained after 8 hours, which corresponded to a catalyst consumption of 1.12 gm/kg of polyethylene. The properties of the polyethylene were:

| melt index $i_5$ | 0.22 gm/10 min. |
|---|---|
| non-homogeneity U | 19 |
| bulk density | 478 gm/l. |

Comparison example

Catalyst preparation and polymerization were carried out as above, but without the addition of titanium tetrachloride. 35.3 l/h of hydrogen were required to obtain a polyethylene of measurable melt index. 25.2 kg of polyethylene had been obtained after 8 hours. the catalyst consumption was 1.27 gm/kg of polymer. The properties of the polymer were:

| melt index $i_5$ | 0.05 gm/10 min. |
|---|---|
| non-homogeneity U | 13.2 |
| bulk density | 481 gm/l. |

EXAMPLE 9

Catalyst preparation 29.4 ml of Component A, prepared as in Example 1, were first reacted for 4 hours in 88 ml of isooctane at 50° C with titanium trichloride-n-propylate, which had been prepared by equilibrating 16.9 ml of titanium tetrachloride and 13.6 ml of titanium tetra-n-propylate for 15 minutes at 60° C. The mixture was diluted with 82 ml of isooctane, and a further 84.2 ml of Component A and 64.9 ml of titanium tetrachloride were added. The mixture was stirred at 40° C for 4 hours.

Polymerization

Polymerization was carried out while adding ethylene to maintain a pressure of 8.8 atmospheres gauge and 80° C. 4 gm/h of catalyst and 17.7 l/h of hydrogen were metered in. 2.2 ml of titanium tetrachloride were metered in per 32 gm of catalyst. 35 kg. of polyethylene had been obtained after 8 hours. the catalyst consumption was 0.91 gm/kg of polymer. The polyethylene had the following properties:

| melt index $i_5$ | 0.35 gm/10 min. |
|---|---|
| non-homogeneity U | 22.3 |
| bulk density | 431 gm/l |

Comparison example

Polymerization was carried out as above but without the addition of titanium tetrachloride. 29.3 kg of polyethylene was obtained after 8 hours; the catalyst consumption was 1.08 gm/kg of polymer. The properties of the polymer were:

| melt index $i_5$ | 0.14 gm/10 min. |
|---|---|
| non-homogeneity U | 15.5 |
| bulk density | 451 gm/l. |

EXAMPLE 10

Catalyst preparation

The catalyst was prepared as in Example 6.

Polymerization 12 l/h of isooctane, 25 l/h of hydrogen, 50 gm/h of but-l-ene, and 6 gm/h of catalyst were fed into the autoclave in addition to the ethylene. Polymerization was carried out for 8 hours at 80° C. Polyethylene was obtained at a rate of 5.63 kg/h. Catalyst consumption was 1.07 gm/kg. The polymer had the following properties:

| melt index $i_5$ | 1.6 gm/10 min. |
|---|---|
| $\eta$ red | 2.6 dl/gm |
| non-homogeneity U | 10.1 |
| density | 0.946 gm/cm$^3$ |
| bulk density | 425 gm/l |
| particle size | 320 $\mu$ |

The polyethylene had a high impact strength and good stress crack resistance. It was particularly suitable for the manufacture of small containers.

Comparison example

A catalyst was prepared in two stages analogously to Example 6, except that 48.2 ml of a reaction product of 1 mol of triethyl aluminum and 1 mol of a methylhydrogenpolysiloxane (according to U.S. Pat. No. 3,755,274) were used instead of Component A.

Polymerization was carried out as above, except that 12 gm/h of catalyst and 102 l/h of hydrogen were used. A polyethylene of similar properties to that obtained above was obtained, but in a greatly reduced yield of only 3.3 kg/h and an increased catalyst consumption of 3.64 gm/kg of polymer. The properties of the polymer were as follows:

| melt index $i_5$ | 1.5 gm/10 min. |
|---|---|
| $\eta$ red | 2.7 dl/gm |
| non-homogeneity U | 9.5 |
| density | 0.945 gm/cm$^3$ |
| bulk density | 414 gm/l |
| particle size | 340 $\mu$ |

EXAMPLE 11

Catalyst preparation

The catalyst was prepared as described in Example 7, but in the presence of 13.1% by weight (relative to the catalyst starting materials) of magnesium chloride.

Polymerization 12 l/h of isooctane, 1.66 gm/h of catalyst, and 5 ml/h of diisobutyl aluminum hydride were metered in throughout the polymerization, in addition to the ethylene. 75 l/h of hydrogen were metered in for the first 3 hours of polymerization, which was carried out at 85° C. 49 l/h of gas were removed from the reactor. During the next hour, polymerization was carried out at 78° C, no hydrogen was fed in, and 624 l/h of gas were discharged.

4.9 kg/h of polymer were formed, at a catalyst consumption of 0.31 gm/kg of polymer. This polymer had a broader molecular weight distribution than that of Example 7, and was readily processable. Its properties were as follows:

| melt index $i_s$ | 3.2 gm/10 min. |
|---|---|
| η red | 2.2 dl/gm |
| non-homogeneity U | 7.6 |
| density | 0.958 gm/cm³. |

EXAMPLE 12

Catalyst preparation 2.32 ml of titanium tetra-n-propylate and 2.88 ml of titanium tetrachloride were equilibrated in 12.5 ml of isooctane at 60° C to give Component B. Component A was prepared from 1 mol, based on the siloxane units, of a methylhydrogenpolysiloxane and 1 mol of diisobutyl aluminum hydride. Component B, 2.5 ml of isooctane, and 5 ml of Component A were then mixed at 70° C for 80 minutes, to give a dark brown catalyst suspension, which was then diluted to 50 ml.

Polymerization 4 ml of the catalyst suspension and 600 ml or isooctane were heated to 75° C in a 1-liter laboratory autoclave. A hydrogen pressure of 2 atmospheres gauge was set up within the autoclave, and then ethylene was continuously injected for 2 hours so as to maintain a pressure of 10 atmospheres gauge within the autoclave. The polymer suspension was worked up, to give 262 gm of low pressure polyethylene having the following properties:

| melt index $i_s$ | 4.5 gm/10 min. |
|---|---|
| non-homogeneity U | 2.3 |
| bulk density | 370 gm/l. |

EXAMPLE 13

Three experiments were carried out analogously to Example 12 with the following modifications:

a. Only 0.4 ml of catalyst suspension were used. Only 14.5 gm of polymer were obtained.

b. The same amount of catalyst suspension was repeatedly eluted with isooctane to wash out soluble components, and was then activated with 0.5 ml of triethyl aluminum in the polymerization chamber. Only about 1 gm of polymer was formed.

The amount of catalyst used in (a) and (b) was evidently too small.

c. The catalyst was eluted as in (b), and 0.5 ml of a suspension of 25 mg of magnesium chloride in isooctane was introduced into the polymerization chamber. 87 gm of polymer were obtained. This shows that a catalyst that is inactive for quantitative reasons can be activated by an inert support.

EXAMPLE 14 a. Component A was prepared from 1 mol, based on the siloxane units, of an ethylhydrogenpolysiloxane and 0.96 mol of diisobutyl aluminum hydride at 60° C. 10 ml of the product (density 0.904 gm/cm³ at 20° C) were reacted in 20 ml of isooctane at 55° C for one hour, with 7.7 ml of titanium tetrachloride as Component B in a small stirred vessel that had been flushed with nitrogen. A dark brown catalyst suspension was obtained.

Polymerization of ethylene was carried out in a 1-liter laboratory autoclave at 10 atmospheres gauge at 80° C using 250 mg of catalyst, 2 atmospheres gauge of hydrogen having been introduced at the beginning of the polymerization. 254 gm of polyethylene were obtained after 2 hours. The polymer had the following properties:

| melt index $i_s$ | 0.42 gm/10 min. |
|---|---|
| non-homogeneity U | 14.5 | b. A catalyst was prepared as above but in the presence of 3.32 gm of magnesium chloride, then eluted with isooctane and activated with 0.5 ml of triethyl aluminum in the polymerization chamber. 102 mg of catalyst was used (corresponding to 4.75 mg of titanium after elution). This gave 247 gm of polymer after 2 hours at 80° C.

c. The procedure under (b) was repeated except that activation was achieved with 0.5 ml of diethyl aluminum hydride. 243 gm of polymer was obtained.

EXAMPLE 15

The procedure described in Example 14 (a) was followed except that, instead of 7.7 ml of titanium tetrachloride, a mixture of 5.76 ml of titanium tetrachloride and 1.23 ml of vanadium oxytrichloride was used. 236 gm of polyethylene having the following properties were obtained:

| melt index $i_s$ | 0.35 gm/10 min. |
|---|---|
| non-homogeneity U | 19.5 |

EXAMPLE 16

The procedure described in Example 14 (a) was followed except that, instead of 7.7 ml of titanium tetrachloride, a mixture of 5.76 ml of titanium tetrachloride and 1.61 ml of vanadium oxydichloride-ethylate was employed. 217.5 gm of low-pressure polyethylene having the following properties were obtained:

| melt index $i_s$ | 2.1 gm/10 min. |
|---|---|
| non-homogeneity U | 8.2 |

EXAMPLE 17

The procedure described in Example 14(b) was repeated except that, instead of the magnesium chloride, 4.2 gm of amorphous silicon dioxide that had largely been freed of silanol groups was used. 146 mg of catalyst (excluding support) gave 236 gm of polyethylene. Similar results were obtained using 2.4 gm of finely ground zirconium dioxide that had been dried at a high temperature, instead of the silicon dioxide.

EXAMPLE 18 a. Titanium trichloride-n-propylate, obtained by equilibrating 4.64 ml of titanium tetra-n-propylate and 5.76 ml of titanium tetrachloride, was reacted with 10 of Component A described in Example 1 in the presence of 1.2 gm of magnesium chloride in 40 ml of isooctane for 3 hours at 60° C. A dark brown catalyst suspension was obtained, from which soluble components were eluted with isooctane.

Polymerization was carried out in a 1-liter laboratory autoclave containing 50 mg of catalyst (corresponding to 4.7 mg of titanium after elution) and 0.5 ml of triethyl aluminum in 600 ml of isooctane. Hydrogen was injected to a pressure of 2 atmospheres gauge and ethylene was continuously injected to give a constant pressure of 10 atmospheres gauge. After 2 hours at 80° C, 301.3 gm of dust-free very coarse-grained polyethylene were obtained. This had an average particle size of 470 $\mu$ and a bulk density of 350 gm/l, which is a relatively high value for this particle size. The polymer retained only traces of titanium (6 ppm) though the catalyst had not been decomposed by the addition of an aliphatic alcohol when working up the product, the only measure taken being to carry out the filtration of the product in air.

b. Similar results were obtained when the manufacture of the catalyst was varied as follows: the equilibration between the titanium tetra-n-propylate and titanium tetrachloride was carried out in the presence of the magnesium chloride in the 40 ml of isooctane for 15 minutes at 60° C, after which Component A was added and the mixture was maintained at 60° C for a further 3 hours.

EXAMPLE 19

Catalyst preparation 1.19 gm of finely ground magnesium chloride and 2.88 ml of titanium tetrachloride were stirred in 18 ml of isooctane for 30 minutes at 90° C. The mixture was cooled to 60° C, and 2.32 ml of titanium tetra-n-propylate were added. The mixture was equilibrated for 15 minutes at 60° C to give titanium trichloride-n-propylate. 2.5 ml of isooctane and 5 ml of Component A described in Example 1 were then added and the mixture was warmed for 30 minutes at 60° C. The mixture was cooled and diluted to 50 ml with isooctane, and eluted with isooctane.

0.36 ml of catalyst suspension (corresponding to 2.2 mg of titanium after elution) and 0.5 ml of triethyl aluminum in 600 ml of isooctane were used for polymerization. Polymerization of ethylene was carried out for 1½ hours at 80° C in the presence of 2 atmospheres gauge of hydrogen and under a continuous introduction of ethylene to maintain a pressure of 10 atmosphere gauge. 232 gm of coarse-grained polyethylene powder of high purity were obtained after simple filtration of the polymer suspension in air.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. In a process for the production of low-pressure polyethylene which comprises polymerizing monomers selected from the group consisting of ethylene and mixtures of ethylene with up to 10 mol percent of $\alpha$-olefins having 3 to 8 carbon atoms at a temperature of from 50° C to 130° C and a pressure of from 1 to 100 atmospheres in the presence of a polymerization catalyst prepared from (a) polymeric organosilicon compounds containing hydrogen bonded to silicon, (b) organoaluminum compounds and (c) compounds of the heavy metals of the IV to VI sub-groups of the Periodic System, the improvement which consists of utilizing, as said polymerization catalyst, the reaction product prepared by the reaction, at a temperature of from 0° to 100° C, of A. a reaction product prepared by the reaction, at a temperature of from 0° to 80° C, of a dialkyl aluminum hydride having from 2 to 8 carbon atoms in each of the alkyls, with a hydrogenpolysiloxane having a viscosity of from 5 to 100 cSt at 25° C and siloxane units having the formula

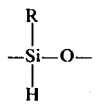

wherein R is a member selected from the group consisting of alkyl having from 1 to 6 carbon atoms, cycloalkyl hving from 5 to 6 carbon atoms and phenyl, said hydrogenpolysiloxane having the three valences of its silicon atoms on the ends of the polysiloxane chain satisfied by R, hydrogen or, at most, one hydroxyl group per end silicon atom, in a molar ratio of from 0.8 to 2 mols of said siloxane units per mol of said dialkyl aluminum hydride, with B. a metallic compound having a formula selected from the group consisting of

wherein X is halogen, R'' is a number selected from the group consisting of alkyl having 1 to 8 carbon atoms and cycloalkyl having from 5 to 6 carbon atoms, and n is an integer from 0 to 2, and mixtures thereof, said Component B being employed in an amount of from 0.1 to 3 mols for each mol of said siloxane units in Component A.

2. The process of claim 1 wherein the reaction between Components A and B is conducted between 20° C and 90° C.

3. The process of claim 1 wherein said dialkyl aluminum hydride has from 2 to 4 carbon atoms.

4. The process of claim 1, wherein said dialkyl aluminum hydride is selected from the group consisting of diethyl aluminum hydride, di-n-butyl aluminum hydride, and diisobutyl aluminum hydride.

5. The process of claim 1, wherein said hydrogenpolysiloxane is selected from the group consisting of methylhydrogenpolysiloxane having a viscosity of from 20 to 40 cSt at 25° C, ethylhydrogenpolysiloxane having a viscosity of from 25 to 40 cSt at 25° C, and phenylhydrogenpolysiloxane having a viscosity of from 45 to 70 cSt at 25° C, each being end-blocked by trimethyl-silyl groups, and methylhydrogencyclotrisiloxane, and methylhydrogencyclotetrasiloxane.

6. The process of claim 1, wherein Compenent A is the reaction product of methylhydrogenpolysiloxane having a viscosity of from 20 to 40 cSt at 25° C with a dialkyl aluminum hydride, the alkyl moieties of which each have from 2 to 4 carbon atoms, in a molar ratio of from 1 to 1.2 mols of siloxane units per mol of dialkyl aluminum hydride.

7. The process of claim 5, wherein Component A is prepared at a temperature of from 20° C to 80° C.

8. The process of claim 1, wherein Component B is selected from the group consisting of titanium trichloride n-propylate or a mixture of titanium tetrachloride and titanium trichloride n-propylate.

9. The process of claim 1, wherein Component B comprises a mixture of an alkanolate and a tetrahalide or oxytrihalide, and wherein Components A and B are reacted in two stages, either the alkanolate-free compound or the alkanolate first being reacted with Component A and then the alkanolate or the alkanolate-free compound, respectively, being added thereto at the reaction temperature.

10. The process of claim 1, wherein Components A and B are reacted in the presence of an inert organic liquid diluent.

11. The process of claim 1, wherein the catalyst is prepared on a support.

12. The process of claim 11, wherein the amount of support is from 1% to 30% by weight relative to the weight of Components A and B.

13. The process of claim 11, wherein the amount of support is from 10% to 20% by weight relative to the weight of Components A and B.

14. The process of claim 11, wherein Component B is first brought into contact with said support at a temperature of from 20° C to 140° C and Component A is subsequently added.

15. The process of claim 11, wherein the catalyst is washed with an inert organic solvent and said polymerization is carried out in the presence of a catalyst activator selected from the group consisting of trialkyl aluminum and dialkyl aluminum hydride, where the alkyl moieties have from 2 to 8 carbon atoms.

16. The process of claim 15, wherein from 8 to 15 mols of trialkyl aluminum or dialkyl aluminum hydride are used per gram atom of titanium or vanadium in the catalyst.

17. The process of claim 1, wherein up to 5% by volume of hydrogen, relative to the ethylene, is introduced into the reaction system.

18. The process of claim 17, wherein the amount of hydrogen introduced is continuously and cyclically varied during polymerization.

19. The process of claim 1, wherein the polymerization temperature is continuously and cyclically varied during polymerization.

20. The process of claim 1, wherein the polymerization pressure is from 5 to 20 atmospheres.

21. A catalyst for the production of low-pressure polyethylene consisting essentially of the reaction product prepared by the reaction, at a temperature of from 0 to 100° C of A. a reaction product prepared by the reaction, at a temperature of from 0° to 80° C, of a dialkyl aluminum hydride having from 2 to 8 carbon atoms in each of the alkyls, with a hydrogenpolysiloxane having a viscosity of from 5 to 100 cSt at 25° C and siloxane units having the formula

wherein R is a member selected from the group consisting of alkyl having from 1 to 6 carbon atoms, cycloalkyl having from 5 to 6 carbon atoms and phenyl, said hydrogenpolysiloxane having the three valences of its silicon atoms on the ends of the polysiloxane chain satisfied by R, hydrogen or, at most, one hydroxyl group per end silicon atom, in a molar ratio of from 0.8 to 2 mols of said siloxane units per mol of said dialkyl aluminum hydride, with B. a metallic compound having a formula selected from the group consisting of

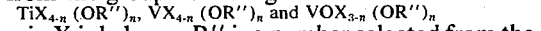

wherein X is halogen, R'' is a number selected from the group consisting of alkyl having 1 to 8 carbon atoms and cycloalkyl having from 5 to 6 carbon atoms, and n is an integer from 0 to 2, and mixtures thereof, said Component B being employed in an amount of from 0.1 to 3 mols for each mol of said siloxane units in Component A.

22. The catalyst of claim 21 wherein the reaction between Components A and B is conducted between 20° C and 90° C.

23. The catalyst of claim 21 wherein said dialkyl aluminum hydride has from 2 to 4 carbon atoms.

24. The catalyst of claim 21 wherein said dialkyl aluminum hydride is selected from the group consisting of diethyl aluminum hydride, di-n-butyl aluminum hydride, and diisobutyl aluminum hydride.

25. The catalyst of claim 21 wherein said hydrogenpolysiloxane is selected from the group consisting of methylhydrogenpolysiloxane having a viscosity of from 20 to 40 cSt at 25° C, ethylhydrogenpolysiloxane having a viscosity of from 25 to 40 cSt at 25° C, and phenylhydrogenpolysiloxane having a viscosity of from 45 to 70 cSt at 25° C, each being end-blocked by trimethyl-silyl groups, and methylhydrogencyclotrisiloxane, and methylhydrogencyclotetrasiloxane.

26. The catalyst of claim 21 wherein Component A is the reaction product of methylhydrogenpolysiloxane having a viscosity of from 20 to 40 cSt at 25° C with a dialkyl aluminum hydride, the alkyl moieties of which each have from 2 to 4 carbon atoms, in a molar ratio of from 1 to 1.2 mols of siloxane units per mol of dialkyl aluminum hydride.

27. The catalyst of claim 21 wherein Component A is prepared at a temperature of from 20° C to 80° C.

28. The catalyst of claim 21 wherein Component B is selected from the group consisting of titanium trichloride n-propylate or a mixture of titanium tetrachloride and titanium trichloride n-propylate.

29. The catalyst of claim 21 wherein Component B comprises a mixture of an alkanolate and a tetrahalide or oxytrihalide, and wherein Components A and B are reacted in two stages, either the alkanolate-free compound or the alkanolate first being reacted with Component A and then the alkanolate or the alkanolate-free compound, respectively, being added thereto at the reaction temperature.

* * * * *